(12) United States Patent
Shipley (10) Patent No.: US 11,936,788 B1
(45) Date of Patent: *Mar. 19, 2024

(54) DISTRIBUTED LEDGER SYSTEM FOR IDENTITY DATA STORAGE AND ACCESS CONTROL

(71) Applicant: United Services Automobile Association (USAA), San Antonio, TX (US)

(72) Inventor: Brian F. Shipley, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/875,976

(22) Filed: Jul. 28, 2022

Related U.S. Application Data (63) Continuation of application No. 17/084,118, filed on Oct. 29, 2020, now Pat. No. 11,418,348, which is a continuation of application No. 15/992,844, filed on May 30, 2018, now Pat. No. 10,826,703.

(60) Provisional application No. 62/515,275, filed on Jun. 5, 2017.

(51) Int. Cl.
| | | |
|---|---|---|
| H04L 9/06 | (2006.01) | |
| G06F 9/54 | (2006.01) | |
| G06F 16/18 | (2019.01) | |
| H04L 9/32 | (2006.01) | |
| H04L 9/40 | (2022.01) | |

(52) U.S. Cl.
CPC .............. *H04L 9/3231* (2013.01); *G06F 9/54* (2013.01); *G06F 16/1805* (2019.01); *H04L 9/0637* (2013.01); *H04L 63/10* (2013.01)

(58) Field of Classification Search
CPC ..... H04L 9/3231; H04L 9/0637; H04L 63/10; G06F 9/54; G06F 16/1805
See application file for complete search history.

(56) References Cited

U.S. PATENT DOCUMENTS

| | | | |
|---|---|---|---|
| 11,334,882 B1* | 5/2022 | Jameson | ............... H04L 9/3231 |
| 2014/0282821 A1 | 9/2014 | Adler et al. | |
| 2017/0213221 A1* | 7/2017 | Kurian | ............... G06Q 20/4014 |
| 2017/0243177 A1 | 8/2017 | Johnsrud et al. | |
| 2017/0243209 A1 | 8/2017 | Johnsrud et al. | |
| 2017/0366348 A1* | 12/2017 | Weimer | ............... H04L 9/0838 |
| 2018/0109516 A1 | 4/2018 | Song et al. | |
| 2018/0343120 A1* | 11/2018 | Andrade | ............... H04L 9/0637 |
| 2018/0374097 A1 | 12/2018 | Hanna | |

(Continued)

*Primary Examiner* — Vu V Tran
(74) *Attorney, Agent, or Firm* — Fletcher Yoder, P.C.

(57) ABSTRACT

Techniques are described for providing delegated access to identity data stored on distributed ledger(s), in which the identity data can include image(s) of physical credential(s) and/or biometric data used to identify individual(s). An application programming interface (API) enables access to the identity data. In some instances, the access is provided to an obfuscated version of the identity data and/or to a hash or other digest of the identity data. The identity data is provided by the API according to the individual's delegation. The individual can specify rules that indicate the particular types of identity data that may be provided and/or used for particular purposes, and/or the particular entities authorized to request the identity data.

11 Claims, 7 Drawing Sheets

(56) References Cited

U.S. PATENT DOCUMENTS

2019/0287116 A1  9/2019 Karantzis
2019/0364426 A1* 11/2019 Muthukrishnan .. G06Q 20/3674
2020/0007316 A1*  1/2020 Krishnamacharya .......................
                                             H04L 9/3231

* cited by examiner

DISTRIBUTED LEDGER SYSTEM FOR IDENTITY DATA STORAGE AND ACCESS CONTROL

CROSS-REFERENCE TO RELATED APPLICATIONS

This application is a continuation of U.S. patent application Ser. No. 17/084,118, now U.S. Pat. No. 11,418,348, entitled "Distributed Ledger System for Identity Data Storage and Access Control," filed Oct. 29, 2020, which in turn is a continuation of U.S. patent application Ser. No. 15/992,844, now U.S. patent Ser. No. 10/826,703, entitled "Distributed Ledger System for Identity Data Storage and Access Control," filed May 30, 2018, which claims priority to and the benefit of U.S. Provisional Patent Application Ser. No. 62/515,275, filed on Jun. 5, 2017, each of which is incorporated herein by reference in their entireties.

BACKGROUND

Organizations that operate online services expend a large amount of computing resources, engineering time, and/or other resources to verify the identity of individuals requesting access to the services. Authentication and/or authorization features operate to ensure that a user is who they claim to be, and that they are authorized to access information or request actions through the services. Traditional methods for authenticating a user may be unreliable given the strong incentive for malicious individuals to attempt unauthorized access, particularly in instances where the services being accessed are related to finance, such that unauthorized parties may gain access to steal funds and/or confidential information.

SUMMARY

Implementations of the present disclosure are generally directed to an identity verification service that stores and controls access to identity data on distributed ledger system(s). More particularly, implementations of the present disclosure are directed to a service that is callable, by requesting entities and/or devices, to request the verification of the identity of an individual, where such requests are constrained by access rules specified by the individual to control the delegation of access to and/or use of the individual's identity data.

In general, implementations of innovative aspects of the subject matter described in this specification can be embodied in a method that includes the following operations: receiving a request that is sent from a requesting device to verify identity of an individual, the request including first identity data of the individual; in response to the request, and based on determining that the request complies with at least one access rule specified by the individual, retrieving second identity data stored on a distributed ledger system (DLS) that includes multiple host node devices, wherein the second identity data has previously been stored on the DLS based at least partly on the second identity data having been verified as identifying the individual; and comparing the first identity data to the second identity data and, based on a correspondence between the first identity data and the second identity data, sending a response to the requesting device indicating that the identity of the individual is verified.

These and other implementations can each optionally include one or more of the following innovative aspects: the first identity data is an image of a physical credential of the individual; the requesting device is a point-of-sale terminal; the at least one access rule specifies one or more requesting entities that are authorized, by the individual, to request identity verification of the individual; determining that the request complies with the at least one access rule includes determining that a requesting entity associated with the requesting device is included in the one or more authorized requesting entities specified by the at least one access rule; the at least one access rule specifies one or more elements of identity data of the individual that are useable for verifying the identity of the individual; determining that the request complies with the at least one access rule includes determining that the first identity data is included in the one or more useable elements of identity data; the DLS is a private DLS; the request is initially sent to a public DLS that stores an obfuscated version of the second identity data, the public DLS being separate from the private DLS; an unobfuscated version of the second identity data is retrieved, from the private DLS, responsive to the request being received at the public distributed ledger; the obfuscated version is a hash of the unobfuscated version of the second identity data; and/or the public DLS stores audit information describing a history of requests to verify the identity of the individual.

Other implementations of any of the above aspects include corresponding systems, apparatus, and/or computer programs that are configured to perform the operations of the methods. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

The implementations described herein provide at least the following technical advantages and/or improvements compared to previously available techniques. By providing an identity verification service that verifies an individual's identity based on identity data that includes image(s) of physical credentials, which have been confirmed as legitimate, implementations provide an authentication system that is more reliable than traditional systems that may depend solely on login, password, and/or other credentials that may be stolen and/or guessed. Accordingly, implementations avoid the expenditure of network bandwidth, storage space, active memory, processing capacity, and/or other computing resources that are used by traditional systems in repeated authentication attempts, such as repeated attempts to recover from errors in authentication and/or fraudulent access requests. Moreover, by using a distributed ledger system to store identity data, implementations incorporate the technical advantages of a distributed ledger including but not limited to data security, data immutability and reliability, and distributed storage (e.g., for failover support and storage redundancy).

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are directed to systems, devices, methods, and computer-readable media for managing access to identity data, including providing delegated access to identity data stored on one or more distributed ledger systems. In some instances, the identity data includes one or more images of physical credential(s) that are used to establish the identity of an individual. Such physical credential(s) can include government-issued documents such as a driver license, passport, birth certificate, marriage certificate, work permit, visa, other types of license(s) or identification document(s), and so forth. The physical credential(s) can also include identifying documents that are issued by non-government entities, such as businesses, educational institutions, financial institutions, and so forth. Identity data may also include biometric data for an individual, such as fingerprint(s), retinal scans, voiceprint data, image(s) of the individual's face, heartbeat/pulse information, and so forth. The identity data may be stored on a distributed ledger system, such as a blockchain, and an application programming interface (API) can be provided to enable access to at least a portion of the identity data. In some instances, the access is provided to an obfuscated version of the identity data and/or to a hash or other digest of the identity data.

The API can be accessed by a merchant or other entity seeking to confirm the identity of an individual (e.g., a customer). For example, to establish their identity, an individual may present their driver license to a merchant. The merchant may scan the license to generate an image, and upload the image through the API to an identity verification service. The service can compare the scanned license to an image of the license that has been verified as the individual's, and that was previously stored on the distributed ledger system. If the two images correspond (e.g., within a threshold level of statistical similarity in the image comparison), the API may return a response to the merchant indicating that the individual's identity is verified. As another example, the merchant may access the API to request an image of the individual's license. The API may provide the image, and the merchant may verify the individual's identity by comparing the downloaded image to the license presented by the individual.

In either instance, the information provided by the API includes information that the individual has authorized the identity verification service to provide. For example, the individual may authorize the service to provide copies of their driver license, but not to provide copies of their biometric data. Alternatively, the individual may authorize the service to provide information that verifies the authenticity of an uploaded credential (e.g., driver license), but the individual may not authorize the release of copies of the credential to entities requesting identity confirmation. In this way, implementations enable the individual to delegate, to the identity verification service, the right to use and/or provide the individual's identity data for verifying the identity of the individual. Such delegation may be governed according to rules that are specified by the individual, the identity verification service, or both. The rules govern the particular ways in which identity data of the individual can be used and/or to what entities the identity data can be distributed and under what circumstances.

Traditionally, an individual may present a physical credential, such as a driver license, to establish their identity to another entity in person. The identity verification service, provided by implementations described herein, employs identity data that includes image(s) of the physical credential that the individual has previously provided to the identity verification service, and which the identity verification service vouches for (e.g., has established is a valid identifying credential for the individual). Such image(s) of the physical credential may be used, in some instances with biometric data and/or other identity data, in a service (e.g., an API) that is callable by third-party entities (e.g., merchants) to verify the identity of the individual. Because such verification is based on the vouched-for physical credential of the individual, implementations provide an identity verification service that is more reliable and less prone to fraud compared to traditional systems that rely on remembered (and guessable) credentials such as a username and password.

In some implementations, the identity data for an individual includes transaction data such as a history of transactions (e.g., debits, credits) performed using account(s) of the individual. The API can provide access to at least a portion of the transaction data for an individual, if the individual indicates that such access is permitted. For example, transaction history from a period of time (e.g., last 30 days, last 90 days, etc.) may be provided to entities that request such data through the API, if such requests comply with the delegated access rule(s) specified by the individual and/or the identity verification service. Different levels of access may be provided to different individuals. For example, a financial advisor of the individual may be granted a broader degree of access to transaction history compared to other entities. In some instances, particular entities and/or types of entities may be barred from accessing the transaction data of an individual.

Identity data can also include information such as biometric data that can be used to authenticate (e.g., verify the identity of) the individual, such as fingerprint data, retinal map data, voiceprint data, image(s) and/or video of the user's face or other body parts (e.g., for facial or body recognition), gait description information, heart rate data, neural activity data (e.g., brain wave data), genetic information (e.g., whole or partial genome data), and so forth.

An individual may have identities established with multiple online services, such as social networks, email providers, e-commerce sites, streaming media services, financial services, and so forth. Accordingly, the different services may maintain different identities for the individual, along with different logins or other sets of credentials. Moreover, the different services may not have visibility into the other identities of the individual maintained by the other services, and a particular service may not be able to establish that the different identities maintained by different services are all associated with a same individual who uses the multiple services. In some implementations, the identity verification service described herein provides a central authority that enables the correlation of the various identities of an individual maintained by different services. For example, a third-party service such as a social network, e-commerce site, streaming media service, or other service may call the API of the identity verification service to verify the identity of an individual who is requesting an account with the third-party service. The identity verification service may use the physical credential image(s) and/or other identity data to verify the individual's identity, and thus provide the third-party service with greater confidence that the individual is who they purport to be.

In some implementations, the identity verification service may store information that associates the various identities of the individual, at various third-party services, with the particular individual, thus establishing a centralized, authoritative identity for the individual across multiple services. Such information may be a mapping or other data structure that is stored and maintained on the distributed ledger(s) described herein. In some implementations, the centralized, authoritative identity verification service may track and/or coordinate various identity tokens that have been issued by various other third-party service, such as tokens that are configured according to a version of Open Authorization (OAuth) standard or some other access delegation standard.

As part of an initial setup and registration process with the identity verification service, an individual may provide image(s) of physical credential(s) such as a driver license, passport, and so forth. The individual may also provide other identifying information such as name, address, telephone number, email address, government identification number (e.g., social security number), and so forth. The individual may also provide biometric data (e.g., fingerprint, facial image(s), voiceprint data, etc.) collected through various sensors (e.g., cameras, microphones, fingerprint scanners, etc.) of the individual's computing device. All this information may be stored, on a distributed ledger, as identity data for the individual and the identity data may be associated with the individual. For example, the identity data may be stored in one or more records, on the distributed ledger, that reference a unique identifier that has been assigned to the individual by the identity verification service to associate all the various identity data for the individual. Changes to the identity data for the individual may be stored on the distributed ledger as well. Because the distributed ledger (e.g., blockchain) provides an immutable record, including a record of all changes made to the data, implementations track the identity of the individual as the identity data evolves over time based on changes to the individual's physical credentials, biometric data, address, and/or other identity data. A call to the API may return a snapshot of the individual's evolving identity at the particular time of the call. The API provides delegated visibility into the identity data, governed by the various rules that have been established by the individual and/or the identity verification service.

Figure 1A:
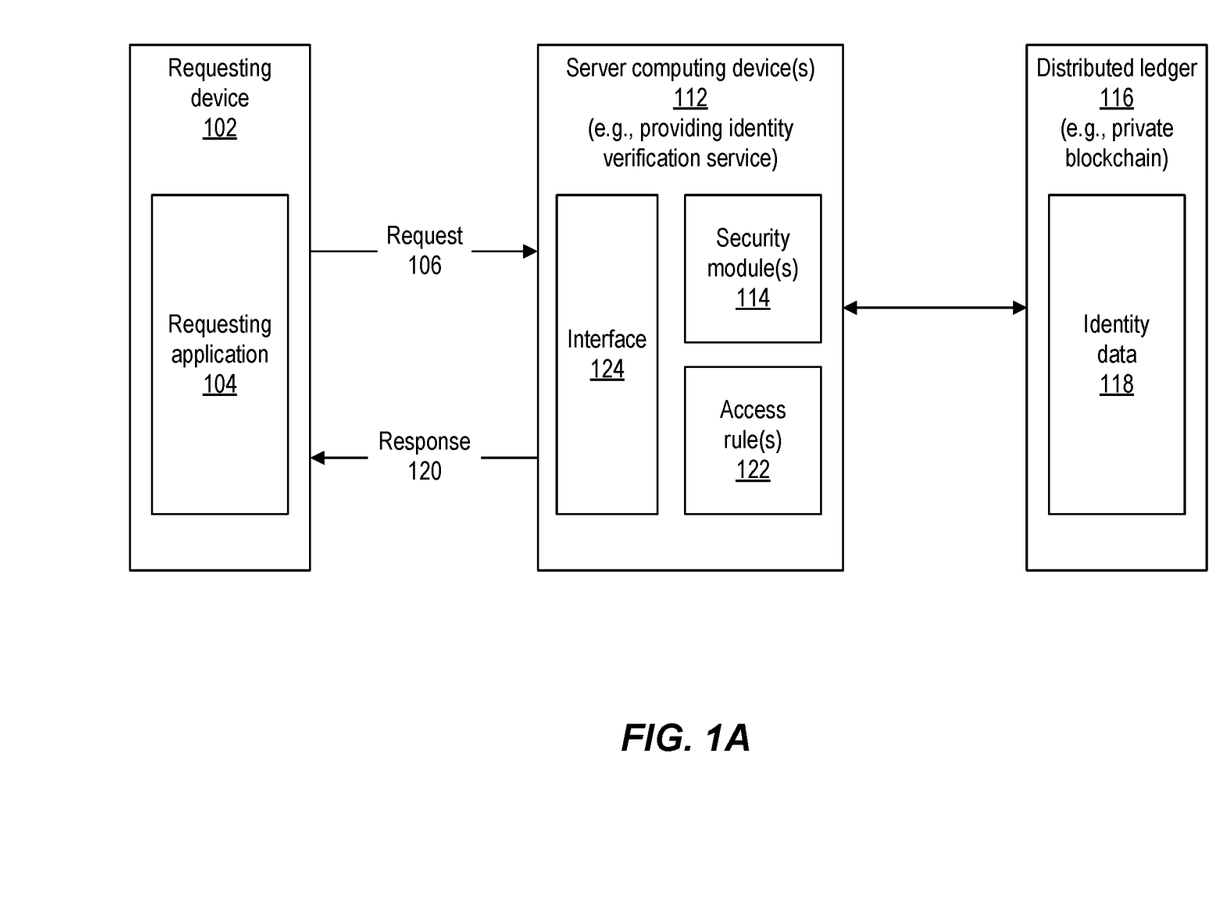
FIG. 1A depicts an example system for identity data access delegation, according to implementations of the present disclosure.

FIG. 1A depicts an example system for identity data access delegation, according to implementations of the present disclosure. A requesting device 102 executes a requesting application 104. The device 102 may be operated by or otherwise associated with an entity that seeks to verify the identity of an individual. For example, the device 102 may be a computing device operated by a merchant, such as a point of sale (POS) terminal or a mobile device (e.g., smartphone, tablet computer, etc.) that executes software to provide POS functionality on the mobile device. In some implementations, the requesting application 104 may be a component of the software that provides the POS functionality. In some instances, the application 104 may be a client application that is configured to communicate with the identity verification service. The requesting device 102 may be any suitable type of computing device, or other device (e.g., POS terminal) that is configured to communicate over one or more networks.

The system also includes one or more server computing devices 112, which may include any suitable number and type of computing device. The server computing device(s) 112 may provide an identity verification service that is callable by various requesting devices 102 to request identity verification for individuals. The device(s) 112 may execute an interface 124 and security module(s) 114. The interface 124 may be an API as described above. The system also includes a distributed ledger 116, such as blockchain(s). The distributed ledger 116 may be a private distributed ledger 116 that is accessible only to authorized processes and/or individuals. The security module(s) 114 executing on the device(s) 112 may be authorized to access the distributed ledger 116, to access data stored on the distributed ledger 116 and/or add data records to the distributed ledger 116. A distributed ledger is also described herein as a distributed ledger system (DLS). A DLS may include any suitable number of host nodes that store information for the DLS. Each host node can include any suitable number and type of network-connected computing devices, and host nodes can be geographically remote from other nodes in the DLS.

The distributed ledger 116 may store identity data 118 associated with one or more individuals. For example, the identity data 118 for an individual may include image(s) of physical credential(s) of the individual, biometric data for the individual, and/or other information used to verify the individual's identity.

The server computing device(s) 112 may store, or otherwise have access to, access rule(s) 122 associated with one or more individuals. The access rule(s) 122 for an individual may constrain access to the individual's identity data 118 on the distributed ledger 116. For example, an individual may specify rule(s) indicating particular entities, or types of entities (e.g., types of businesses) that may be given access to the individual's identity data 118, which particular elements (e.g., biometric data, image(s) of physical credential(s), transaction history, etc.) of the identity data 118 are to be accessible, time constraint(s) on the access to the identity data 118, location-based constraints indicating that entities from particular geographic locations are to be allowed to, or blocked from, accessing the identity data 118, and so forth. The rule(s) may be specified by an individual. The rule(s) may also be specified by the identity verification service.

A user of the requesting device 102 (e.g., a merchant) may log into the device 102 and interact with the requesting application 104. The user may employ the application 104 to send a request 106 to the device(s) 112. The request 106 may be received through an interface 124, such as an API exposed by the device(s) 112. For example, the request 106 may be to verify identity information for an individual, such as a customer of the merchant. In such instances, the request 106 may communicate the data to be verified, as well as an identifier (e.g., name, ID number, etc.) of the individual being checked. In a particular example, the individual may present a physical credential (e.g., driver license) to the merchant, and the merchant may send a request 106 to the identity verification service requesting verification that the presented credential is legitimate. The security module(s) 114 may receive the request through the interface 124, and access the identity data 118 on the ledger 116 to verify that the presented identity data corresponds the data stored on the ledger 116. The service may return a response 120 indicating a correspondence or lack of correspondence between the presented data and the data retrieved from the ledger 116. In such examples, the request 106 is querying the service to check whether presented identity data matches the identity data that is stored on the ledger 116 and that corresponds to the individual.

In some implementations, the request 106 may be sent to request delivery of particular element(s) of identity data 118 for an individual. For example, an individual may present a physical credential (e.g., driver license) to a merchant, and the merchant may use the application 104 to request an image of the physical credential. The security module(s) 114 may retrieve the image of the physical credential of the individual from the ledger 116, and communicate the retrieved image in the response 120. The application 104 may then present the retrieved image in the display of the device 102 to enable the merchant to compare the individual's presented physical credential to the image of the credential retrieved from the ledger 116, thus verifying that the individual is who they purport to be.

In either example, the access rule(s) 122 may govern whether the request 106 can be processed, based on the identity and/or characteristics of the requesting device 102 and/or the user (e.g., merchant) logged into the device 102.

Figure 1B:
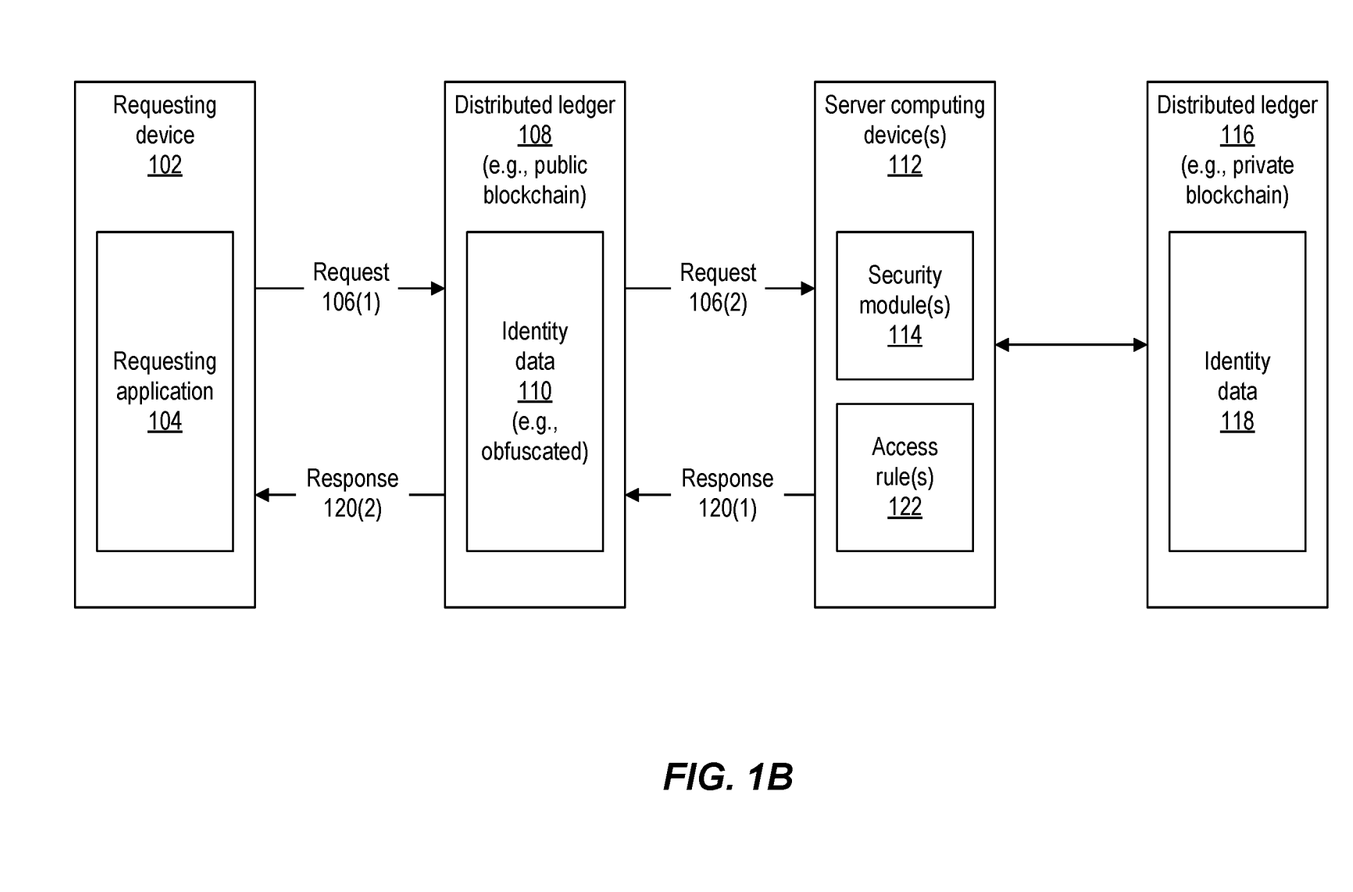
FIG. 1B depicts an example system for identity data access delegation, according to implementations of the present disclosure.

FIG. 1B depicts an example system for identity data access delegation, according to implementations of the present disclosure. In some implementations, as shown in FIG. 1B, the system may include both public ledger(s) 108 and private ledger(s) 116. A public ledger 108 may be accessible by any process and/or entity that can communicate with the public ledger 108 over a network. As described above, the application 104 may generate a request 106(1) to the public ledger 108. The public ledger 108 may store a hashed, encrypted, and/or otherwise obfuscated version of the identity data 110 for individual(s). For example, the private ledger 116 may store an image of a physical credential for an individual, whereas the public ledger 108 stores a hash of the image.

The initial request 106(1) to the public ledger 108 may spawn an initial response 120(2) indicating that the ledger 108 stored identity data 110, in obfuscated format, for the individual. The request 106(1) may also prompt a subsequent request 106(2) that is sent from the public ledger 108 to the device(s) 112, indicating that an unobfuscated version of the data is being requested for delivery, or is being requested to be checked against presented data (e.g., a presented credential). In some implementations, the request 106(2) may be generated and sent by a smart contract or other process executing on the ledger 108 (e.g., on the computing node(s) that also host the ledger 108). The security module(s) 114 may receive the request 106(2) as described with reference to FIG. 1A, access the private ledger 116 to fulfill the request 106(2), and generate a response 120(1) that is sent to the ledger 108. The response 120(1) may trigger a response 120(2) that is sent from the ledger 108 to the application 104, responding to the initial request 106(1). Alternatively, the response 120(1) may be sent directly to the application 104 without passing through the ledger 108 as an intermediary.

For example, the request 106(1) may include an image of the credential to be verified, and the security module(s) 114 may retrieve the certified image of the credential from the ledger 116, compare it to the presented image, and send a response indicating correspondence or lack of correspondence between the images. As another example, the request 106(1) may include a hash of the image of the credential, generated by the application 104 using the same hashing algorithm that is used to generate the hashed versions of the identity data 110 on the public ledger 108. In such examples, the presented hash may be compared to the stored hash on the ledger 108 (e.g., compared through operation of a smart contract), and the response 120(2) may indicate a match or lack thereof. Alternatively, the response 120(2) may include the hash that is stored on the ledger 108, and the application 104 can compare the retrieved hash to the hash of the presented credential to verify the individual's identity.

In general, a request may indicate one or more elements of identity data to be verified based on the information stored on the ledger(s). Such verification may be based on comparing presented data to ledger-stored data, for each element of identity data to be verified, including but not limited to credential image(s), biometric data, digital credentials (e.g., login, password, PIN, challenge question answers, etc.), and so forth.

Figure 2:
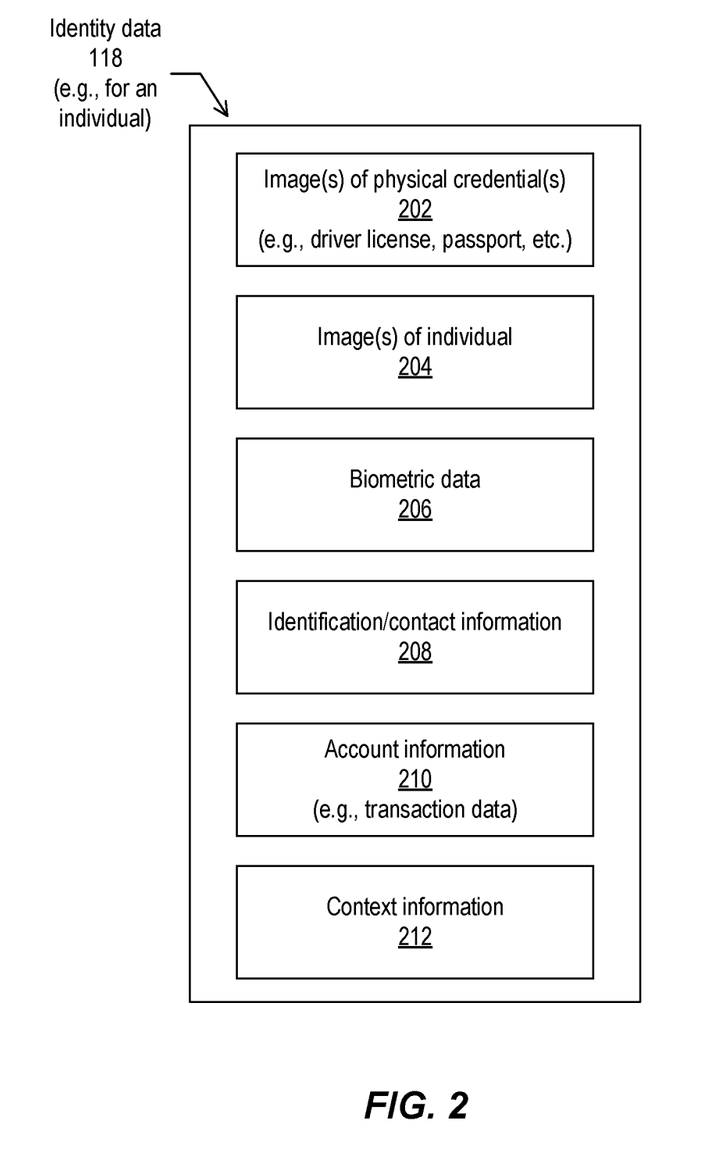
FIG. 2 depicts an example of identity data, according to implementations of the present disclosure.

FIG. 2 depicts an example of identity data 118, according to implementations of the present disclosure. The identity data 118 for each individual may be stored on a distributed ledger. The identity data 118 for an individual may include one or more images 202 of each of one or more physical credentials of the individual. The data may also include image(s) 204 of the individual themselves, such as image(s) of the individual's face to be used in facial recognition based identity verification. The data may include biometric data 206 for the individual, describing one or more physiological characteristics of the individual. Biometric data 206 can include, but is not limited to one or more of the following: fingerprint scan, retinal scan, neural activity data (e.g., brainwave scans), heartbeat/pulse data, EKG scans, perspiration measurement data, blood sugar measurement data, and/or other information.

The identity data 118 can include identification and/or contact information 208 for the individual, such as the individual's full name, mailing address(es), email address(es), telephone number(s), identification number(s), and so forth. The identity data 118 can include account information 210, such as transaction data describing a history of transactions to and/or from one or more accounts associated with the individual. The identity data 118 can also include context information 212 for the individual. Context information 212 can include locations, regions, areas, and/or typical ranges of travel for the individual, patterns of behavior related to purchases, hobbies, affiliations, and so forth, and/or other context. Any or all elements of the identity data 118 may be hashed or otherwise obfuscated and stored on a public ledger, in addition to being stored on the private ledger.

Context information can also include data identifying assets owned by the individual, such as vehicles, real property, and/or other types of products. This information can include identifiers of the assets, images of the assets, descriptions of the assets, technical specifications of the assets, and so forth. The context information can also include information identifying various computing devices that are owned by, operated by, and/or otherwise associated with the individual, such as portable computing devices (e.g., smartphones, wearable devices, automotive computing systems, etc.), less portable computing devices (e.g., desktop computers, etc.), internet-of-things (IoT) devices (e.g., smart home appliances, security systems, entertainment systems, lighting and/or environment control systems, etc.), and so forth. The context information can also include information generated by these various devices, such as sensor data and/or operational data generated by IoT devices, telematics devices, and so forth.

Figure 3:
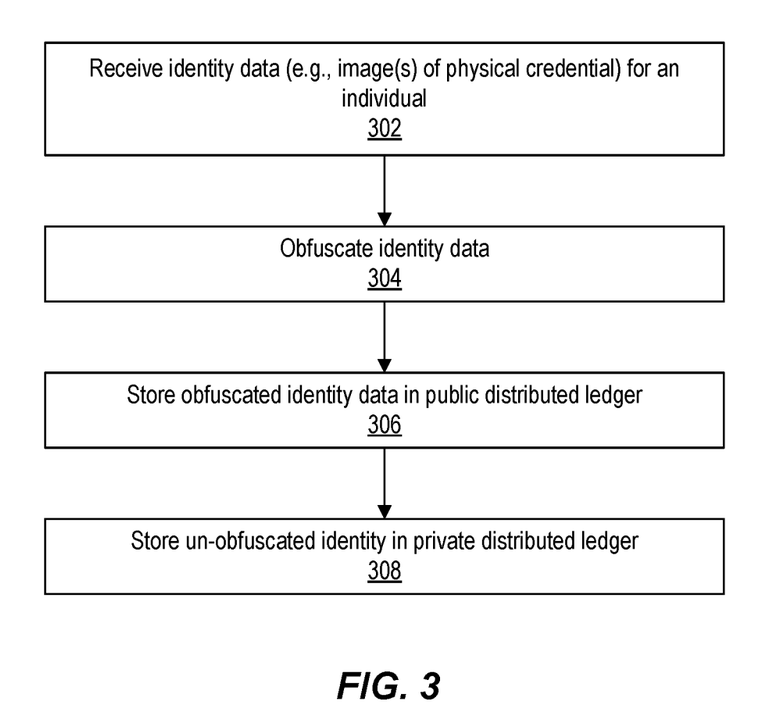
FIG. 3 depicts a flow diagram of an example process for storing identity data, according to implementations of the present disclosure.

FIG. 3 depicts a flow diagram of an example process for storing identity data, according to implementations of the present disclosure. Operations of the process can be performed by one or more of the application 104, the interface 124, the security module(s) 114, smart contract(s) or other process(es) executing on the ledger(s) 108 and/or 116, and/or other software module(s) executing on the device 102, the device(s) 112, the computing device(s) that host the ledger(s), and/or elsewhere.

The identity data 118 for an individual is received (302). As described above, the identity data 118 can include, but is not limited to, image(s) of physical credential(s), biometric data, other identifying information for the individual, and so forth. The identity data 118 can also include transaction history for the individual's accounts, context information describing the individual's travel patterns, purchase habits, interests, etc., and/or other information.

At least a portion of the identity data 118 is obfuscated (304). In some implementations, obfuscation may include hashing the identity data 118 using a suitable hashing algorithm. Obfuscation may also include encryption of at least a portion of the data.

The obfuscated identity data 110 is stored on a public ledger (306) that is generally accessible. The unobfuscated identity data 118 is stored on a private ledger (308) that is accessible only by authorized processes and/or individuals, such as the security module(s) 114 of the identity verification service. In some implementations, the obfuscated and unobfuscated data may each be stored under a same key that is uniquely associated with the individual who is associated with the identity data (e.g., who is identified by the identity data). In this way, requests to access the obfuscated data may be mapped to access the unobfuscated data by processes (e.g., the security module(s)) that are authorized to access the private ledger.

Figure 4:
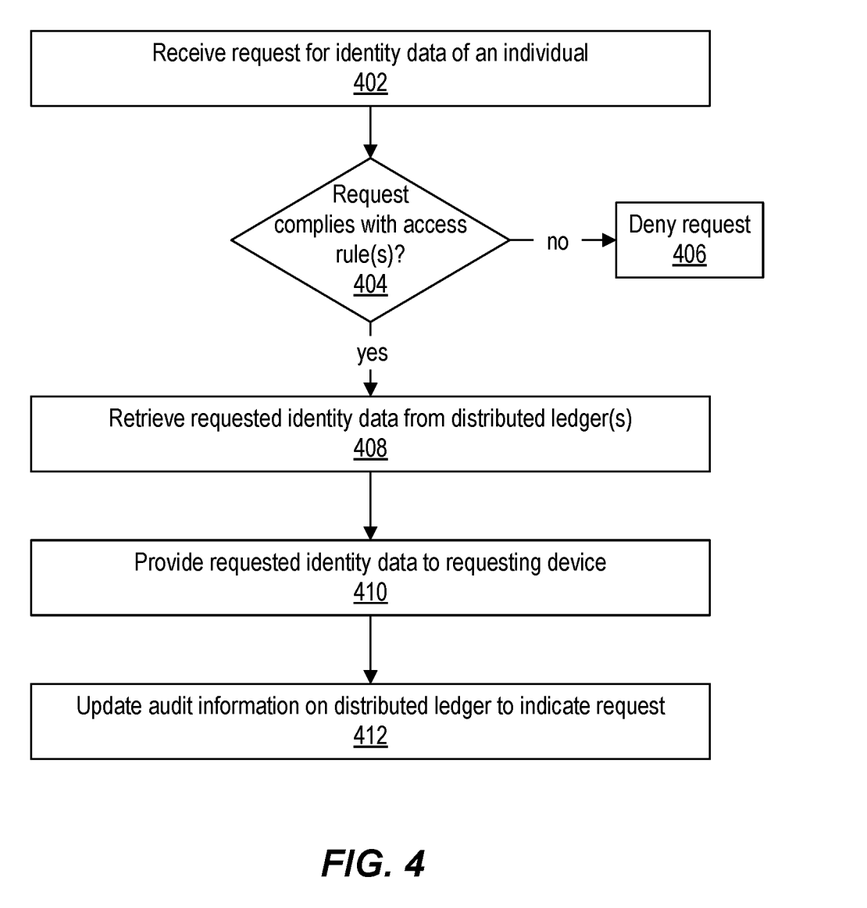
FIG. 4 depicts a flow diagram of an example process for accessing identity data, according to implementations of the present disclosure.

FIG. 4 depicts a flow diagram of an example process for accessing identity data, according to implementations of the present disclosure. Operations of the process can be performed by one or more of the application 104, the interface 124, the security module(s) 114, smart contract(s) or other process(es) executing on the ledger(s) 108 and/or 116, and/or other software module(s) executing on the device 102, the device(s) 112, the computing device(s) that host the ledger(s), and/or elsewhere.

A request is received (402), requesting identity data for an individual. For example, a request may be made for an image of the individual's driver license, to be compared to the license being presented to the requestor (e.g., merchant) by the individual. In some instances, the request includes data that is to be confirmed as legitimate identity data for the individual. For example, the request may include an image of the driver license presented by the individual to the requestor, and a request may be made to verify that the image of the presented license corresponds to the license stored as identity data of the individual on the distributed ledger. Such scenarios are described with reference to FIG. 5.

The request is analyzed to determine (404) whether it complies with the access rule(s) that govern use of the individual's identity data. If the request does not comply with any of the rules, the request may be denied (406). If the request complies with each of the applicable rules, request processing may proceed, and the requested identity data is retrieved (408) from the distributed ledger where it is stored. As described above, the data stored on the ledger(s) can by obfuscated or unobfuscated. For example, an entity may request to access audit history (e.g., transaction history) associated with an individual, without auditing the underlying data. The public ledger can be queried if the requesting entity has the appropriate key, token, or other security credential.

The identity data is provided (410) to the requesting device, and may be presented in a user interface of the requesting application 104. In some implementations, the distributed ledger may store audit information describing a history of requests to access the identity data and/or a history of updates to the identity data. In such implementations, the audit information stored on the ledger may be updated (412) to indicate that the request has been made, and that the request was either approved or disapproved based on the access rule(s). In some implementations, the audit information described herein, including a record of requests for identity data of the individual and/or requests for verification of identity data for the individual, can be stored on the public distributed ledger 108.

Figure 5:
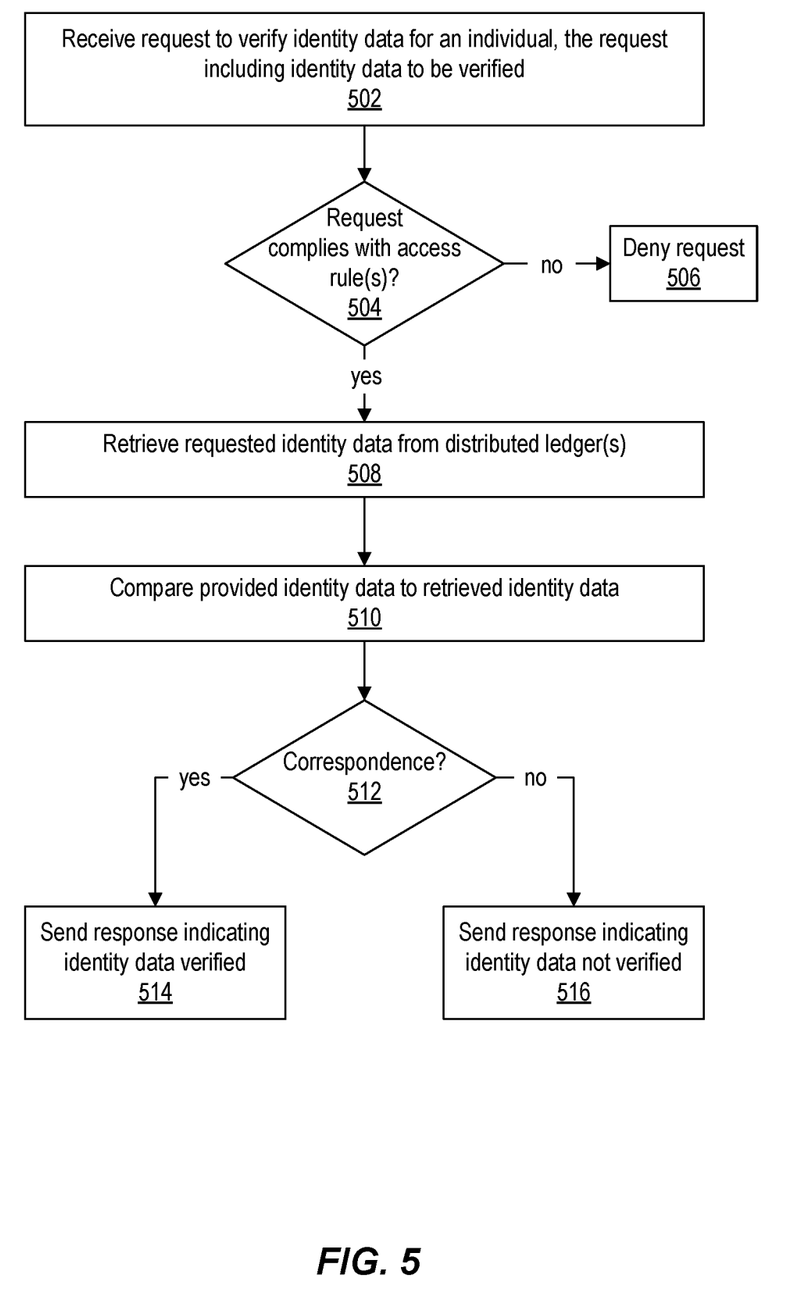
FIG. 5 depicts a flow diagram of an example process for accessing identity data, according to implementations of the present disclosure.

FIG. 5 depicts a flow diagram of an example process for accessing identity data, according to implementations of the present disclosure. Operations of the process can be performed by one or more of the application 104, the interface 124, the security module(s) 114, smart contract(s) or other process(es) executing on the ledger(s) 108 and/or 116, and/or other software module(s) executing on the device 102, the device(s) 112, the computing device(s) that host the ledger(s), and/or elsewhere.

A request is received (502), requesting verification of identity data for an individual. For example, the request can include data that is to be confirmed as legitimate identity data for the individual, such as an image of the driver license presented by the individual to the requestor, and a request may be made to verify that the image of the presented license corresponds to the license stored as identity data of the individual on the distributed ledger.

The request is analyzed to determine (504) whether it complies with the access rule(s) that govern use of the individual's identity data. If the request does not comply with any of the rules, the request may be denied (506). If the request complies with each of the applicable rules, request processing may proceed, and the requested identity data is retrieved (508) from the distributed ledger where it is stored.

The retrieved data is compared (510) to the data provided for verification in the request, to determine (512) whether the two sets of data correspond. If there is a correspondence, a response is sent indicating that the identity data is verified (514). If there is not a correspondence, a response is sent indicating that the identity data is not verified (516).

For example, insurance company A may insure a claimant who claims they were involved in a car accident with some unidentified person who is known to be insured by insurance company B. The claimant can provide a picture of the identified person's vehicle. Company A may upload the image through the interface and request, from the identify verification service, owner information regarding the owner of the vehicle in the uploaded image. If the owner has provided prior authorization, the service may return to company A contact information and/or insurance policy information regarding the owner. In some instances, the service applies machine learning techniques to analyze images and determine an owner of the vehicle based on the provided image. As another example, an individual can use a smartphone camera (e.g., video and/or still image(s)) to retrieve a vehicle identification number (VIN) of a vehicle of interest for insurance claim or purchase inquiry. The service may return ownership and/or insurance information as authorized by the owner of the vehicle. In such instances, the owner entity may be a company such as a dealership or vehicle manufacturer, and such entity may specify the rules according to which the entity's identity data may be accessed and/or used. In general, identity data (e.g., driver license) can be used as a foundational starting point for a strongly verifiable asset type. Implementations support various techniques to determine identity and/or ownership through image data (e.g., still image(s) and/or video) of physical objects, and link such image data to specific individual(s) with a degree of certainty.

In some instances, the comparison may result in a confidence metric or a measure of similarity between the provided data and the retrieved data. For example, the provided license image may be compared to the retrieved license image using an image comparison algorithm to determine a degree of similarity between the two images (e.g., 80% similar). The similarity metric may be returned in the response as a confidence metric indicating how confident the service is that the individual is who they claim to be. Alternatively, the response may include a binary, yes/no response that is determined based on comparing the similarity metric to a predetermined threshold. For example, a similarity measure of at least 75% may lead to a determination that the individual's identity is verified (e.g., a yes answer), whereas a similarity measure below that threshold may lead to a determination that the individual's identity is not verified (e.g., a no answer).

In some implementations, the requesting entity (e.g., the merchant) may pay a fee to the identity verification service in exchange for the verification. In some instances, the fee is charged when an individual's identity is verified but is not charged when the individual's identity is not verified. Alternatively, the fee is charged for each request regardless of the response. In some instances, the fee is not charged if the individual is not registered with the identity verification service, such that identity data of the individual has not previously been verified and stored on the ledger(s). The fee may be a fee per request. In some instances, the requestor may subscribe to the identity verification service, and pay a periodic (e.g., monthly) fee to use the service.

The identity verification service may provide identity verification as described above. Additionally, the service may also expose other types of identity data for an individual, constrained by the access rule(s) established by the individual and/or the service. For example, the service may provide, through its interface, transaction history data to requesting entities who are given permission through the access rules. As another example, the service may provide context information such as data describing typical location(s) of the individual.

Implementations employ a distributed ledger system, including one or more distributed ledgers (e.g., blockchains), store the identity data, and to track requests to access the identity data. The distributed ledger system enables the storing and tracking to be performed efficiently and inexpensively. The distributed ledger system also provides security, such that only authorized individuals and/or processes are able to access the data stored on the distributed ledger system. The distributed ledger system also provides immutability, such that data records written to the distributed ledger may not be changed or removed once written.

In some implementations, the distributed ledger is a blockchain. A blockchain is a public or private ledger of all transactions that have been executed in one or more contexts (e.g., negotiable instrument transactions, digital currency transactions, access determinations, instances of providing access, etc.). A blockchain may grow as completed blocks are added with a new set of transactions. In some examples, a single block is provided from multiple transactions (e.g., multiple deposits of different checks by different people). In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device (or a cluster of multiple devices) that uses a client to validate and relay transactions. Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all entities on the blockchain network may need to know all previous transactions to validate a requested transaction, all entities must agree on which transactions have actually occurred, and in which order. For example, if two entities observe different transaction histories, they will be unable to come to the same conclusion regarding the validity of a transaction. The blockchain enables all entities to come to an agreement as to transactions that have already occurred, and in which order. In short, and as described in further detail below, a ledger of transactions is agreed to based on the amount of work required to add a transaction to the ledger of transactions (e.g., add a block to the blockchain). Blockchains may also employ other protocols. In this context, the work is a task that is difficult for any single node (e.g., computing device) in the peer-to-peer network to quickly complete, but is relatively easy for a node (e.g., computing device) to verify.

The peer-to-peer network includes so-called miners (e.g., computing devices) that add blocks to a blockchain based on the blockchain protocol. In general, multiple miners validate transactions that are to be added to a block, and compete (e.g., perform work, as introduced above) to have their block added to the blockchain. Validation of transactions includes verifying digital signatures associated with respective transactions. For a block to be added to the blockchain, a miner must demonstrate a proof of work before their proposed block of transactions is accepted by the peer-to-peer network, and is added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to be created block, and a nonce value (e.g., a random number used only once).

Multiple nodes may compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner may be required to produce hundreds or thousands of hash values, before any one miner provides a qualifying hash value (e.g., at least the first four characters of the hash value are each zero).

In some cases, the distributed ledger or blockchain system can include one or more sidechains. A sidechain can be described as a blockchain that validates data from other blockchains. In some examples, a sidechain enables ledger assets (e.g., a digital currency) to be transferred between multiple blockchains. The blockchain may be a public blockchain, such that data stored on the blockchain is generally accessible. The blockchain may be a private blockchain, such that the stored data is accessible only to authorized individuals and/or processes on the blockchain.

Figure 6:
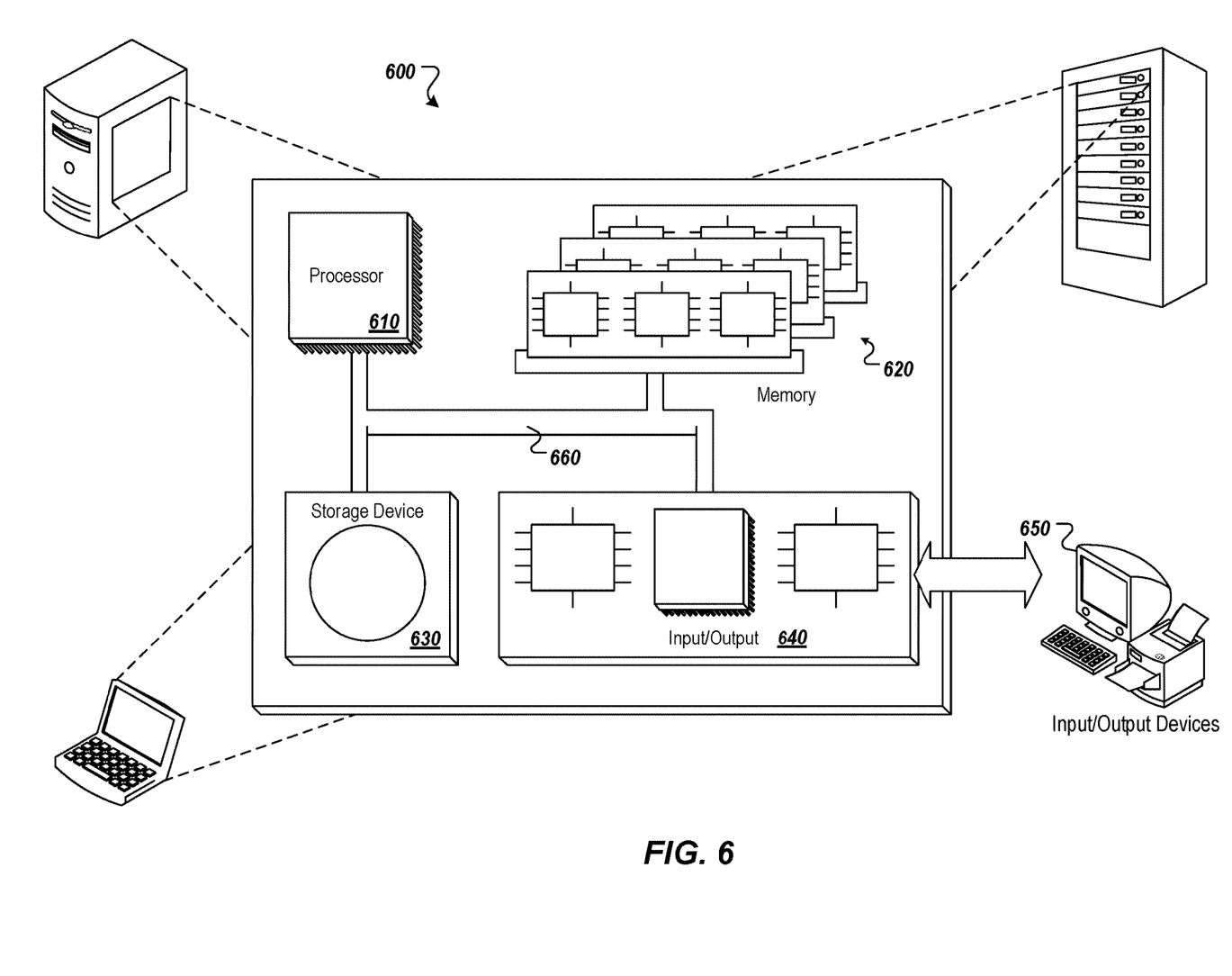
FIG. 6 depicts an example computing system, according to implementations of the present disclosure.

FIG. 6 depicts an example computing system, according to implementations of the present disclosure. The system 600 may be used for any of the operations described with respect to the various implementations discussed herein. For example, the system 600 may be included, at least in part, in one or more of the requesting device 102, the server computing device(s) 112, the node(s) that host the distributed ledger(s) 108 and/or 116, and/or other computing device(s) or system(s) described herein. The system 600 may include one or more processors 610, a memory 620, one or more storage devices 630, and one or more input/output (I/O) devices 650 controllable via one or more I/O interfaces 640.

The various components 610, 620, 630, 640, or 650 may be interconnected via at least one system bus 660, which may enable the transfer of data between the various modules and components of the system 600.

The processor(s) 610 may be configured to process instructions for execution within the system 600. The processor(s) 610 may include single-threaded processor(s), multi-threaded processor(s), or both. The processor(s) 610 may be configured to process instructions stored in the memory 620 or on the storage device(s) 630. For example, the processor(s) 610 may execute instructions for the various software module(s) described herein. The processor(s) 610 may include hardware-based processor(s) each including one or more cores. The processor(s) 610 may include general purpose processor(s), special purpose processor(s), or both.

The memory 620 may store information within the system 600. In some implementations, the memory 620 includes one or more computer-readable media. The memory 620 may include any number of volatile memory units, any number of non-volatile memory units, or both volatile and non-volatile memory units. The memory 620 may include read-only memory, random access memory, or both. In some examples, the memory 620 may be employed as active or physical memory by one or more executing software modules.

The storage device(s) 630 may be configured to provide (e.g., persistent) mass storage for the system 600. In some implementations, the storage device(s) 630 may include one or more computer-readable media. For example, the storage device(s) 630 may include a floppy disk device, a hard disk device, an optical disk device, or a tape device. The storage device(s) 630 may include read-only memory, random access memory, or both. The storage device(s) 630 may include one or more of an internal hard drive, an external hard drive, or a removable drive.

One or both of the memory 620 or the storage device(s) 630 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 600. In some implementations, the CRSM may include a data store that provides storage of computer-readable instructions or other information in a non-transitory format. The CRSM may be incorporated into the system 600 or may be external with respect to the system 600. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 610 and the memory 620 may be supplemented by, or incorporated into, one or more application-specific integrated circuits (ASICs).

The system 600 may include one or more I/O devices 650. The I/O device(s) 650 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 650 may also include one or more output devices such as a display, LED(s), an audio output device (e.g., a speaker), a printer, a haptic output device, and so forth. The I/O device(s) 650 may be physically incorporated in one or more computing devices of the system 600, or may be external with respect to one or more computing devices of the system 600.

The system 600 may include one or more I/O interfaces 640 to enable components or modules of the system 600 to control, interface with, or otherwise communicate with the I/O device(s) 650. The I/O interface(s) 640 may enable information to be transferred in or out of the system 600, or between components of the system 600, through serial communication, parallel communication, or other types of communication. For example, the I/O interface(s) 640 may comply with a version of the RS-232 standard for serial ports, or with a version of the IEEE 1284 standard for parallel ports. As another example, the I/O interface(s) 640 may be configured to provide a connection over Universal Serial Bus (USB) or Ethernet. In some examples, the I/O interface(s) 640 may be configured to provide a serial connection that is compliant with a version of the IEEE 1394 standard.

The I/O interface(s) 640 may also include one or more network interfaces that enable communications between computing devices in the system 600, or between the system 600 and other network-connected computing systems. The network interface(s) may include one or more network interface controllers (NICs) or other types of transceiver devices configured to send and receive communications over one or more communication networks using any network protocol.

Computing devices of the system 600 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 600 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A system comprising:
at least one processor; and
a memory communicatively coupled to the at least one processor, the memory storing instructions which, when executed, cause the at least one processor to perform operations comprising:
  receiving a request to receive verified information associated with a vehicle, and an image of the vehicle from a requesting device;
  determining that the request complies with at least one access rule associated with accessing the verified information of the vehicle;
  identifying the vehicle associated with the image;
  retrieving the verified information of the vehicle stored on a distributed ledger system (DLS), wherein the DLS includes multiple host node devices; and
  sending the verified information of the vehicle to the requesting device.

2. The system of claim 1, wherein the verified information comprises contact information of an individual associated with the vehicle, an insurance policy information of the vehicle, a vehicle identification number (VIN) of the vehicle, or a combination thereof.

3. The system of claim 1, wherein the instructions which, when executed, cause the at least one processor to perform the operations for determining that the request complies with the at least one access rule comprises:
determining that a requesting entity associated with a requesting device is included as one or more authorized requesting entities authorized as specified by the at least one access rule.

4. The system of claim 1, wherein the instructions which, when executed, cause the at least one processor to perform the operations for determining that the request complies with the at least one access rule comprises:
determining that the received request corresponds to one or more elements of the verified information of the vehicle, wherein the at least one access rule is indicative of the one or more elements of the verified information of the vehicle that are useable for verifying identity of an individual associated with the vehicle.

5. The system of claim 4, wherein the one or more elements comprise biometric data, identification information, contact information, account information, context information, an image, one or more images of physical credentials, or any combination thereof of the individual, and wherein the request comprises the one or more elements.

6. The system of claim 1, wherein the instructions which, when executed, cause the at least one processor to perform the operations for determining that the request complies with the at least one access rule comprises:
- accessing a public distributed ledger comprising an obfuscated version of the image of the vehicle; and
- retrieving the obfuscated version of the image of the vehicle from the public distributed ledger to identify the vehicle.

7. One or more non-transitory computer-readable medium comprising one or more computer-executable instructions that, when executed by a processor, are configured to cause the processor to perform operations comprising:
- receiving a request to determine an identity of an individual associated with a vehicle and an image of the vehicle from a requesting device;
- determining that the received request complies with at least one access rule previously specified by the individual;
- identifying the vehicle associated with the image;
- retrieving verified identity data of the individual stored on a distributed ledger system comprising multiple host node devices, wherein the verified identity data has been previously verified as identifying the individual associated with the vehicle; and
- providing the verified identity data of the individual to the requesting device.

8. The one or more non-transitory computer-readable medium of claim 7, wherein the verified identity data comprises an image of a physical credential of the individual.

9. The one or more non-transitory computer-readable medium of claim 7, wherein the computer-executable instructions that, when executed by a processor, are configured to cause the processor to perform the operations comprising:
- determining that a requesting entity associated with a requesting device is included as one or more authorized requesting entities authorized as specified by the at least one access rule.

10. The one or more non-transitory computer-readable medium of claim 7, wherein the requesting device comprises a point-of-sale terminal.

11. The one or more non-transitory computer-readable medium of claim 7, wherein the computer-executable instructions that, when executed by a processor, are configured to cause the processor to perform the operations comprising:
- accessing a public distributed ledger comprising an obfuscated version of the image of the vehicle; and
- retrieving the obfuscated version of the image of the vehicle from the public distributed ledger to identify the vehicle.

* * * * *